US012646103B2

(12) United States Patent
Han

(10) Patent No.: US 12,646,103 B2
(45) Date of Patent: Jun. 2, 2026

(54) ORDER MANAGEMENT METHODS, SYSTEM, TERMINAL AND ELECTRONIC DEVICE BASED ON MULTI-PERSON ORDERING

(71) Applicant: KOUBEI (SHANGHAI) INFORMATION TECHNOLOGY CO., LTD., Shanghai (CN)

(72) Inventor: Fenglei Han, Shanghai (CN)

(73) Assignee: KOUBEI (SHANGHAI) INFORMATION TECHNOLOGY CO., LTD., Shanghai (CN)

( * ) Notice: Subject to any disclaimer, the term of this patent is extended or adjusted under 35 U.S.C. 154(b) by 963 days.

(21) Appl. No.: 17/760,763

(22) PCT Filed: Mar. 30, 2020

(86) PCT No.: PCT/CN2020/082158
§ 371 (c)(1),
(2) Date: Mar. 15, 2022

(87) PCT Pub. No.: WO2021/051775
PCT Pub. Date: Mar. 25, 2021

(65) Prior Publication Data
US 2022/0343398 A1     Oct. 27, 2022

(30) Foreign Application Priority Data

Sep. 16, 2019     (CN) .......................... 201910872699.3

(51) Int. Cl.
G06Q 30/00          (2023.01)
G06Q 20/10          (2012.01)
(Continued)

(52) U.S. Cl.
CPC ....... G06Q 30/0635 (2013.01); G06Q 20/102 (2013.01); *G06Q 50/12* (2013.01)

(58) Field of Classification Search
CPC ... G06Q 30/0635; G06Q 20/102; G06Q 50/12
See application file for complete search history.

(56) References Cited

U.S. PATENT DOCUMENTS

| | | | |
|---|---|---|---|
| 2011/0320349 A1 | 12/2011 | Olsen et al. | |
| 2018/0046947 A1 | 2/2018 | Clayton et al. | |
| 2020/0387954 A1* | 12/2020 | Sadhankar ............. | G06Q 20/36 |

FOREIGN PATENT DOCUMENTS

| | | |
|---|---|---|
| CN | 102117520 A | 7/2011 |
| CN | 104978697 A | 10/2015 |
| (Continued) | | |

OTHER PUBLICATIONS

Gomber, Peter and Kauffman, Robert J. and Parker, Chris and Weber, Bruce, On the Fintech Revolution: Interpreting the Forces of Innovation, Disruption and Transformation in Financial Services (Dec. 20, 2017). Journal of Management Information Systems, 35(1), 2018, 220-265. (Year: 2017).*

(Continued)

*Primary Examiner* — Anand Loharikar
(74) *Attorney, Agent, or Firm* — Getech Law LLC; Jun Ye

(57)          ABSTRACT

An order management method and system based on multi-person ordering are provided. The method includes: obtaining order payment data corresponding to an order data record, where the order data record is created according to a service device identifier and a user identifier included in an ordering service request received each time; according to a respective user identifier included in an order identifier code of the order data record, adding the order payment data to a user historical payment record corresponding to the respective user identifier, where the order identifier code of the order data record includes the service device identifier and a plurality of user identifiers associated with the service device identifier; sending each user historical payment (Continued)

Obtain order payment data corresponding to a pre-created order data record, where the order data record is created according to a service device identifier and a user identifier included in an ordering service request received each time — S110

According to a respective user identifier included in an order identifier code of the order data record, add the order payment data to a user historical payment record corresponding to the respective user identifier, where the order identifier code of the order data record includes the service device identifier and a plurality of user identifiers associated with the service device identifier — S120

Send the user historical payment record corresponding to the respective user identifier to a user terminal corresponding to the respective user identifier such that the corresponding user terminal manages the order data record through an order management portal which is associated with the order payment data and included in the user historical payment record — S130 record to each user terminal such that the user terminal manages the order data record.

9 Claims, 3 Drawing Sheets

(51) Int. Cl.
   *G06Q 30/0601*      (2023.01)
   *G06Q 50/12*      (2012.01)

(56)                References Cited

FOREIGN PATENT DOCUMENTS

| | | | |
|---|---|---|---|
| CN | 104992357 | A | 10/2015 |
| CN | 106096940 | A | 11/2016 |
| CN | 106296365 | A | 1/2017 |
| CN | 107358421 | A | 11/2017 |
| CN | 107909442 | A | 4/2018 |
| CN | 108053301 | A | 5/2018 |
| CN | 108876549 | A | 11/2018 |
| CN | 109657827 | A | 4/2019 |
| CN | 109711923 | A | 5/2019 |
| CN | 109739890 | A | 5/2019 |
| CN | 110738479 | A | 1/2020 |
| JP | 2002056248 | A | 2/2002 |
| WO | 2013157679 | A1 | 10/2013 |

OTHER PUBLICATIONS

State Intellectual Property Office of the People's Republic of China, First Office Action and Search Report Issued in Application No. 2019108726993, Apr. 29, 2020, 29 pages. (Submitted with Machine/Partial Translation).
State Intellectual Property Office of the People's Republic of China, Second Office Action and Search Report Issued in Application No. 2019108726993, Jun. 30, 2020, 29 pages. (Submitted with Machine/Partial Translation).
State Intellectual Property Office of the People's Republic of China, Third Office Action and Search Report Issued in Application No. 2019108726993, Oct. 12, 2020, 31 pages. (Submitted with Machine/Partial Translation).
ISA State Intellectual Property Office of the People's Republic of China, International Search Report Issued in Application No. PCT/CN2020/082158, May 27, 2020, WIPO, 4 pages.
ISA State Intellectual Property Office of the People's Republic of China, Written Opinion of the International Searching Authority Issued in Application No. PCT/CN2020/082158, May 27, 2020, WIPO, 6 pages. (Submitted with Machine/Partial Translation).
"Data Fusion Algorithm Summary" "http://blog.sina.com.cn/s/blog_eaa1e70c0102vvkf.html", Aug. 10, 2015, 13 pages.
CN202110390723.7—First Office Action mailed on May 25, 2023, 10 pages.
CN202110390723.7—Second Office Action mailed on Sep. 9, 2023, 19 pages.
Rui et al., "Project of extension services to Railway Telephone Ticketing and Reservation System", Railway Information Technology, vol. 25, No. 5, 3 pages. (English abstract attached).

* cited by examiner

Figure 1:
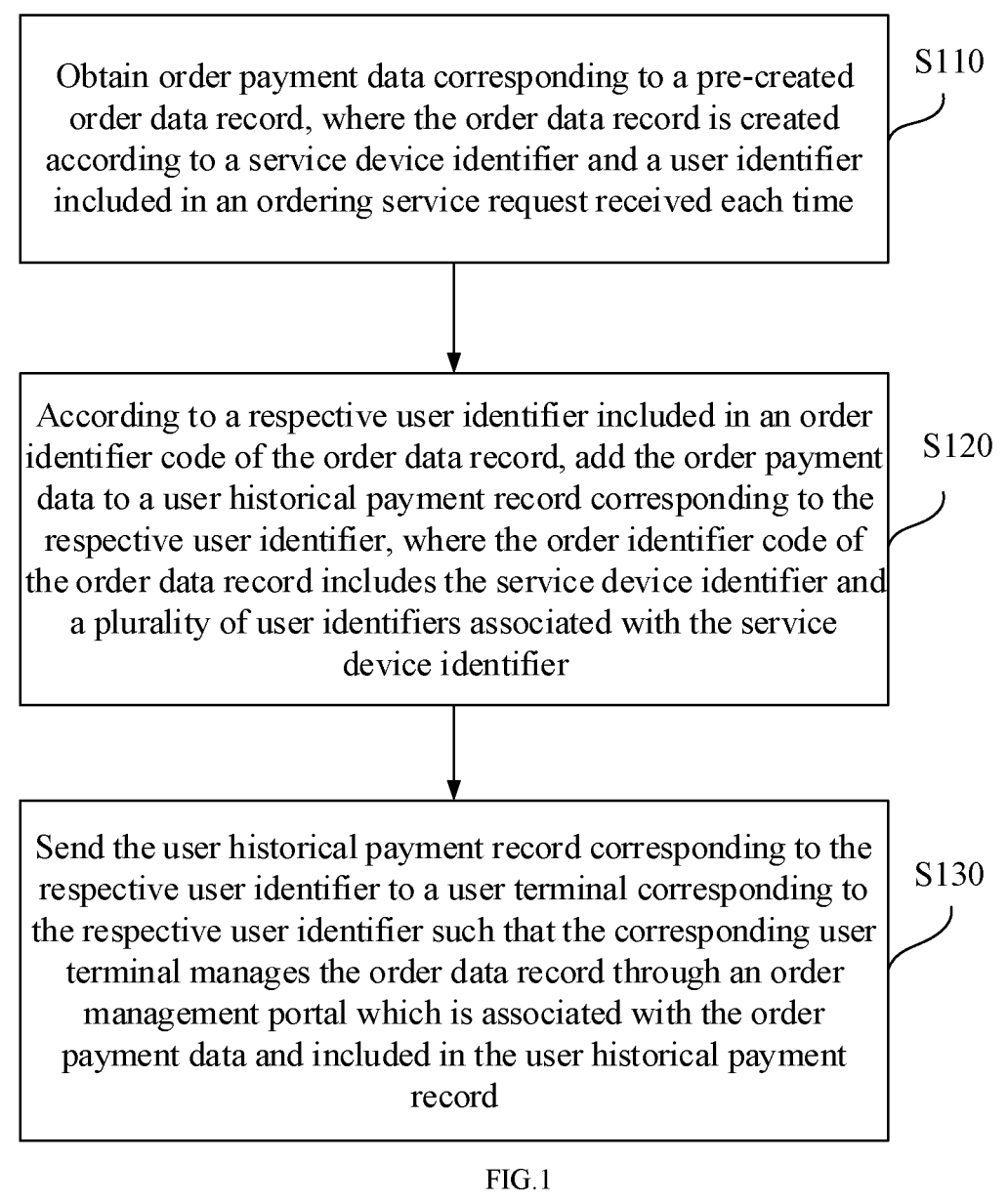

Obtain order payment data corresponding to a pre-created order data record, where the order data record is created according to a service device identifier and a user identifier included in an ordering service request received each time

S110

According to a respective user identifier included in an order identifier code of the order data record, add the order payment data to a user historical payment record corresponding to the respective user identifier, where the order identifier code of the order data record includes the service device identifier and a plurality of user identifiers associated with the service device identifier

S120

Send the user historical payment record corresponding to the respective user identifier to a user terminal corresponding to the respective user identifier such that the corresponding user terminal manages the order data record through an order management portal which is associated with the order payment data and included in the user historical payment record

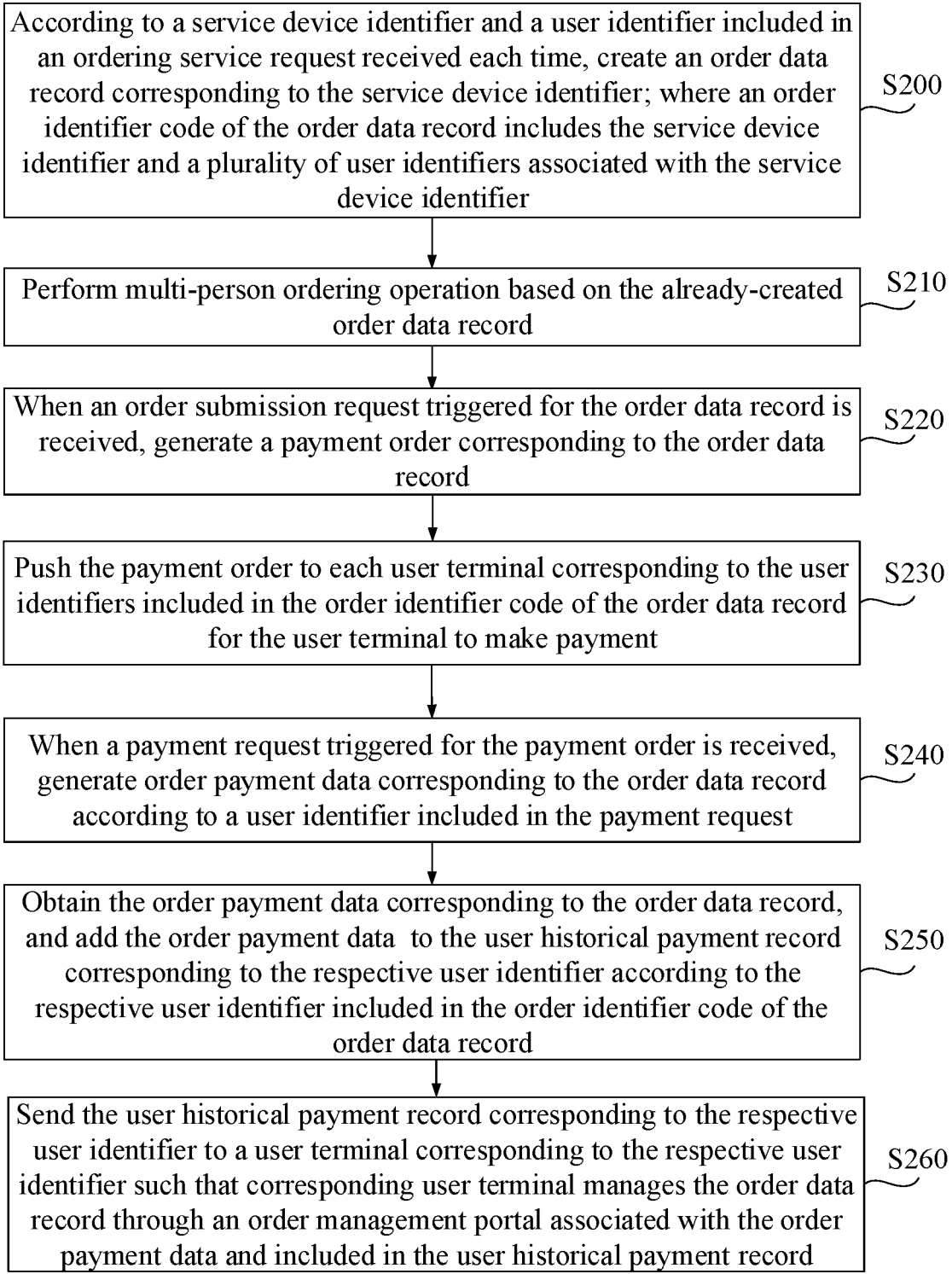

According to a service device identifier and a user identifier included in an ordering service request received each time, create an order data record corresponding to the service device identifier; where an order identifier code of the order data record includes the service device identifier and a plurality of user identifiers associated with the service device identifier          S200

Perform multi-person ordering operation based on the already-created order data record          S210

When an order submission request triggered for the order data record is received, generate a payment order corresponding to the order data record          S220

Push the payment order to each user terminal corresponding to the user identifiers included in the order identifier code of the order data record for the user terminal to make payment          S230

When a payment request triggered for the payment order is received, generate order payment data corresponding to the order data record according to a user identifier included in the payment request          S240

Obtain the order payment data corresponding to the order data record, and add the order payment data to the user historical payment record corresponding to the respective user identifier according to the respective user identifier included in the order identifier code of the order data record          S250

Send the user historical payment record corresponding to the respective user identifier to a user terminal corresponding to the respective user identifier such that corresponding user terminal manages the order data record through an order management portal associated with the order payment data and included in the user historical payment record          S260

FIG.2

ORDER MANAGEMENT METHODS, SYSTEM, TERMINAL AND ELECTRONIC DEVICE BASED ON MULTI-PERSON ORDERING

CROSS REFERENCE TO RELATED APPLICATIONS

This application is a U.S. National Phase application of PCT/CN2020/082158, filed on Mar. 30, 2020, which claims priority to Chinese Patent Application No. 201910872699.3 filed on Sep. 16, 2019. The entire content of the above-referenced applications are incorporated herein by reference.

TECHNICAL FIELD

The present disclosure relates to the field of electronic information, and in particular to order management methods and system based on multi-person ordering.

BACKGROUND

At present, many services may be obtained by electronic ordering operations through internet, thereby saving inconveniences of ordering by staff. In most service scenarios, a user often uses a service alone, and correspondingly, is required to perform ordering operations. But, in some service scenarios, a plurality of users may use one group of services at the same time, and desire to participate in ordering operations together. However, a conventional service architecture only supports the ordering operations of a single user and does not support cooperative ordering operations of a plurality of users.

In the patent application with application No. 2015100461021, there is disclosed a multi-person ordering system allowing multiple persons to participate in meal ordering operations together. In the system, an initiator logs into the system firstly and then searches for restaurant information and selects a restaurant, and then initiates meal ordering and invites friends to order meals together by a member group chat function, thereby the requirements of ordering meals by multiple persons simultaneously being satisfied.

However, the above manner in the prior art at least has the following disadvantages: although multiple users can participate in meal ordering, an order can be identified at an order backstage based only on ordering information of the order initiator, and cannot be identified based on ordering information of other ordering users. Correspondingly, only the order initiator has authority to pay and manage the order whereas other ordering users has no such authority, bringing inconveniences to order management in the multi-person ordering scenarios.

SUMMARY

In view of the above problems, the present disclosure is provided to provide order management methods and system based on multi-person ordering, so as to solve the above problems or at least solve part of the above problems.

According to one aspect of the present disclosure, there is provided an order management method based on multi-person ordering, including:

obtaining order payment data corresponding to a pre-created order data record, where the order data record is created according to a service device identifier and a user identifier comprised in an ordering service request received each time;

according to a respective user identifier comprised in an order identifier code of the order data record, adding the order payment data to a user historical payment record corresponding to the respective user identifier, where the order identifier code of the order data record comprises the service device identifier and a plurality of user identifiers associated with the service device identifier;

sending the user historical payment record corresponding to the respective user identifier to a user terminal corresponding to the respective user identifier such that a corresponding user terminal manages the order data record through an order management portal which is associated with the order payment data and comprised in the user historical payment record.

According to another aspect of the present disclosure, there is provided an order management method based on multi-person ordering, including:

sending an order querying request comprising a user identifier to a server;

receiving a user historical payment record generated by the server based on an order data record of which an order identifier code comprises the user identifier;

displaying the user historical payment record such that order management is performed based on the user historical payment record.

According to another aspect of the present disclosure, there is provided an order management system based on multi-person ordering, including:

an obtaining module, configured to obtain order payment data corresponding to a pre-created order data record, where the order data record is created according to a service device identifier and a user identifier comprised in an ordering service request received each time;

a payment record adding module, configured to, according to a respective user identifier comprised in an order identifier code of the order data record, add the order payment data to a user historical payment record corresponding to the respective user identifier; where the order identifier code of the order data record comprises the service device identifier and a plurality of user identifiers associated with the service device identifier;

a sending module, configured to send the user historical payment record corresponding to the respective user identifier to a user terminal corresponding to the respective user identifier such that a corresponding user terminal manages the order data record through an order management portal which is associated with the order payment data and comprised in the user historical payment record.

According to another aspect of the present disclosure, there is provided an order management terminal based on multi-person ordering, including:

a querying module, configured to send an order querying request comprising a user identifier to a server;

a receiving module, configured to receive a user historical payment record generated by the server based on an order data record of which the order identifier code comprises the user identifier;

a displaying module, configured to display the user historical payment record such that order management is performed based on the user historical payment record.

According to another aspect of the present disclosure, there is provided an electronic device, including a processor, a memory, a communication interface and a communication bus, where the processor, the memory and the communication interface communicate with each other via the communication bus;

the memory is configured to store at least one executable instruction, and the executable instruction causes the processor to perform operations corresponding to the above order management method based on multi-person ordering.

According to another aspect of the present disclosure, there is provided a non-transitory computer readable storage medium storing at least one executable instruction, where the executable instruction causes a processor to perform operations corresponding to the above order management method based on multi-person ordering.

According to another aspect of the present disclosure, there is provided a computer program product, where the computer program product includes computer programs stored in a non-transitory computer storage medium.

In the order management methods and system based on multi-person ordering according to the present disclosure, after order payment data corresponding to a pre-created order data record is obtained, the order payment data is added to a user historical payment record corresponding to the respective user identifier respectively according to a respective user identifier included in an order identifier code of the order data record. In this way, corresponding user terminal can manage the order data record through an order management portal which is associated with the order payment data and included in the user historical payment record. It can be seen that, in the above manner, the order identifier code of the order data record includes a service device identifier and a plurality of user identifiers associated with the service device identifier; correspondingly, one order can be uniquely identified based on the service device identifier, and the historical payment record of the user identified by the corresponding user identifier. Thus, it can be ensured that each ordering user can have authority to manage the order, thereby improving the flexibility of order management.

The above descriptions are merely brief descriptions of the technical solutions of the present disclosure. In order to help understand the technical approaches of the present disclosure more clearly to carry out the present disclosure based on the contents of the specification and make the above and other objects, features and advantages of the present disclosure clearer and more straightforward, specific embodiments of the present disclosure are enumerated below.

BRIEF DESCRIPTION OF THE DRAWINGS

By reading the detailed descriptions of the embodiments below, various other advantages and benefits will become apparent to those skilled in the art. The accompanying drawings are used only to show the embodiments but not to limit the present disclosure. In the entire drawings, like reference numerals refer to like components.

FIG. 1 is a flowchart illustrating an order management method based on multi-person ordering according to a first embodiment of the present disclosure.

FIG. 2 is a flowchart illustrating an order management method based on multi-person ordering according to a second embodiment of the present disclosure.

DETAILED DESCRIPTION OF THE EMBODIMENTS

Figure 3:
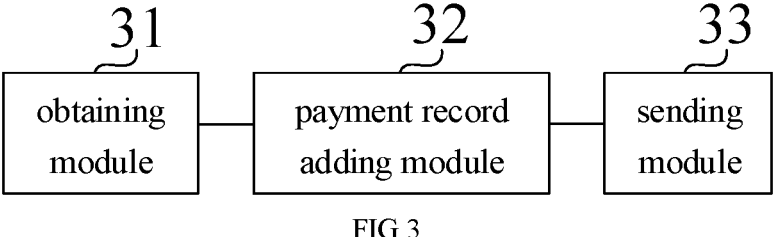
FIG. 3 is a schematic structural diagram illustrating an order management system based on multi-person ordering according to a third embodiment of the present disclosure.

Exemplary embodiments of the present disclosure will be described in more details by referring to the accompanying drawings. Although the exemplary embodiments of the present disclosure are shown in the accompanying drawings, it should be understood that the present disclosure can be implemented in various forms and shall not be limited by the embodiments described herein. These embodiments are provided to help understand the present disclosure more thoroughly and convey the scope of the present disclosure to those skilled in the art fully.

First Embodiment

FIG. 1 is a flowchart illustrating an order management method based on multi-person ordering according to a first embodiment of the present disclosure. As shown in FIG. 1, the method includes the following steps.

At step S110, order payment data corresponding to a pre-created order data record is obtained, where the order data record is created according to a service device identifier and a user identifier included in an ordering service request received each time.

The order data record is used to record information relating to various service stages of one order from ordering initiation operation to completion of order payment. The order payment data refers to data generated when an order payment corresponding to the order data record is completed and relating to a process of the payment. Specifically, the order payment data includes payment user, payment amount, payment mode, payment time and service item details and the like.

Specifically, according to a service device identifier and a user identifier included in an ordering service request received each time, an order data record corresponding to the service device identifier is pre-created, where an order identifier code of the order data record includes the service device identifier and a plurality of user identifiers associated with the service device identifier. The ordering service request may be sent in a plurality of manners such as code scanning in order to perform an ordering operation. The ordering service request includes the service device identifier and the user identifier. The service device identifier refers to an identifier of a service device for providing the service, and the service device may include an electronic device, or a service table or a service room or the like. The user identifier refers to an identifier of a user sending the ordering service request, for example, a user account and the like. In an example, based on a service device identifier included in an ordering service request received each time, a plurality of user identifiers corresponding to a same service device identifier can be associated together, and further, a corresponding order data record, which can be identified by the service device identifier, is created.

At step S120, according to a respective user identifier included in an order identifier code of the order data record, the order payment data is added to a user historical payment record corresponding to the respective user identifier, where the order identifier code of the order data record includes the service device identifier and a plurality of user identifiers associated with the service device identifier.

Specifically, for a respective user identifier included in the order identifier code of the order data record, the order payment data is added to the user historical payment record corresponding to the respective user identifier. For each user, there is a corresponding user historical payment record which is used to describe payment records of the user in a historical period. Each entry in the payment record is used to describe payment details of a corresponding order. The user can query for a certain paid order in the user historical payment record.

At step S130, the user historical payment record corresponding to the respective user identifier is sent to a user terminal corresponding to the respective user identifier such that the corresponding user terminal manages the order data record through an order management portal which is associated with the order payment data and included in the user historical payment record.

The user historical payment record received by the respective user terminal may include the order management portal associated with the order payment data, through which the order data record corresponding to the order payment data may be managed. The order management portal may include portals such as a query portal, a refund portal, an evaluation portal and the like, which is not limited in the present disclosure.

It can be seen that, in the above manner, the order identifier code of the order data record includes a service device identifier and a plurality of user identifiers associated with the service device identifier; correspondingly, one order can be uniquely identified based on the service device identifier, and the historical payment record of the user identified by the corresponding user identifier. Thus, it can be ensured that each ordering user can have authority to manage the order, thereby improving the flexibility of order management.

Second Embodiment

FIG. 2 is a flowchart illustrating an order management method based on multi-person ordering according to a second embodiment of the present disclosure. As shown in FIG. 2, the method includes the following steps.

At step S200, according to a service device identifier and a user identifier included in an ordering service request received each time, an order data record corresponding to the service device identifier is created; where an order identifier code of the order data record includes the service device identifier and a plurality of user identifiers associated with the service device identifier.

Specifically, each time an ordering service request is received, a service device identifier and a user identifier included in the received ordering service request are obtained, and whether an effective billing identifier associated with the service device identifier is present in a preset billing data table is determined. If the effective billing identifier is present, an already-created order data record corresponding to the service device identifier and the effective billing identifier is obtained and the user identifier included in the ordering service request received this time is added to an order identifier code of the order data record. If there is no effective billing identifier associated with the service device identifier in the billing data table, an effective billing identifier associated with the service device identifier is generated, the service device identifier and the generated effective billing identifier are stored in the billing data table in an associated manner, and an order data record corresponding to the service device identifier and the effective billing identifier is created, where an order identifier code of the created order data record includes the service device identifier, the effective billing identifier and the user identifier included in the ordering service request received this time. The ordering service request can be sent in a plurality of manners such as code scanning, in order to perform an ordering operation. For example, the service device can be provided with an information code such as a two-dimensional code including a service device identifier, and correspondingly, the ordering service request is a code scanning ordering request based on the two-dimensional code. Specifically, the ordering service request includes a service device identifier and a user identifier. The service device identifier refers to an identifier of a service device for providing the service, and the service device may include an electronic device, or a service table or a service room or the like. The user identifier refers to an identifier of a user sending the ordering service request, for example, a user account and the like.

In some examples, each time an ordering service request is received, according to a service device identifier included in the ordering service request, it is determined whether a billing processing has been performed for a service device corresponding to the service device identifier. The billing processing refers to that a service user performs ordering operation for the service device, that is, the service device is changed from an idle state to a non-idle state. Specifically, the determination about the billing processing is based on whether an effective billing identifier associated with the service device identifier is present in a preset billing data table. The billing data table may store an effective billing identifier corresponding to each service device identifier, and it can be determined based on the effective billing identifiers present in the billing data table that each service device is in an idle state or a non-idle state. Specifically, the billing data table may store billing flow data, and correspondingly, a billing flow number associated with the service device identifier is generated according to the billing flow data and then the billing flow number is taken as an effective billing identifier. Because the billing flow number includes timestamp information, it can be accurately identified whether one service device is idle currently.

When an effective billing identifier associated with the service device identifier is present in the billing data table, it indicates that the corresponding service device is currently in a non-idle state. Therefore, there is already a service user who performs billing processing for the service device. Correspondingly, an already-created order data record corresponding to the service device identifier and the effective billing identifier is obtained, and the user identifier included in the ordering service request received this time is added to an order identifier code of the order data record. In this way, a number of service users associated with the service device identifier can be increased, such that the order data record corresponding to the service device identifier includes user identifiers of a plurality of service users.

When there is no effective billing identifier associated with the service device identifier present in the billing data table, it indicates the corresponding service device is currently in an idle state and a billing processing is required. Correspondingly, an effective billing identifier associated with the service device identifier is generated, and the service device identifier and the effective billing identifier are stored in the billing data table in an associated manner, so as to achieve the billing processing for the service device. In this case, it is identified that the service device is in a non-idle state. Next, an order data record corresponding to the service device identifier and the effective billing identifier is created where an order identifier code of the order data record includes the service device identifier, the effective billing identifier and the user identifier included in the ordering service request received this time.

It can be seen that, the order identifier code created in the present disclosure includes: a first field for storing a service device identifier, a second field for storing an effective billing identifier, and a third field for storing a user identifier. The third field further includes a plurality of sub-fields corresponding to different user identifiers respectively, and each user identifier corresponds to an ordering service request received each time respectively. In the above manner, a plurality of ordering users can be associated with the service device identifier, such that an order data record is created based on the service device identifier. One piece of order data record is used to store service records of one order relating to various service stages from order creation to order payment.

At step S210, multi-person ordering operation is performed based on the already-created order data record.

Specifically, service item data associated with the service device identifier is pushed to a user terminal corresponding to the user identifier included in the ordering service request received this time, such that, in response to receiving a service item addition request triggered by the user terminal for the service item data, a service item included in the service item addition request is added to a service item field included in the order data record. That is, according to a received service item addition request triggered for the order data record, a service item corresponding to the service item addition request is added to the service item field included in the order data record. The service item field may record name and number of each service item corresponding to the order data record, such that a service is provided to a user based on the service item field. When the service device is a service table (e.g. dining table), the service item data may include food data served to be selected by a user. Therefore, each time one ordering service request is received, based on a service device identifier included in the ordering service request, service item data corresponding to the service device identifier is pushed to a corresponding ordering user, which can be achieved by querying a preset service item database, where the service item database may store a mapping relationship between each service device and a service item corresponding to the service device. In the above manner, a plurality of code scanning ordering users corresponding to a same service device can perform ordering operation based on the service item data. Correspondingly, when a backstage server receives a service item addition request, based on a service device identifier included therein, the backstage server may determine an order data record corresponding to the service item addition request, and further record a service item included in the service item addition request in a service item field of the order data record. Thus, a plurality of different service users can trigger service item addition requests for a same service device, and correspondingly, the backstage server adds service items in the service item addition requests triggered by the plurality of different service users for the same service device to the service item field of the corresponding order data record, thereby achieving the effect of performing ordering by multiple persons simultaneously.

At step S220, when an order submission request triggered for the order data record is received, a payment order corresponding to the order data record is generated.

Specifically, in response to that an ordering process is ended, any one of a plurality of ordering users may initiate an order submission request. Correspondingly, when the order submission request triggered for the order data record is received, a payment order corresponding to the order data record is generated according to each service item added to the service item field included in the order data record, and an order amount of the payment order is determined according to the number of each service item added to the service item field and a service resource cost corresponding to the service item. The service item addition request triggered for the order data record includes a plurality of service item addition requests sent by user terminals corresponding to each user identifier included in the order identifier code of the order data record respectively.

Therefore, in some examples, the order data record may store service records of one order relating to various service stages including order creation, service item addition and order payment etc. The order data record may store information of various service stages and various service levels of one order in a centralized way, so as to fully describe a state of this order. The payment order is an order which is derived from the order data record and specially used to achieve payment function. The payment order and the order data record corresponding to the payment order are associated through an order identifier code. Because the payment order is independent of the order data record and can be made in several copies, the effect that multiple users have authority to make payment is achieved by separating the order data record from the payment order in the present disclosure.

At step S230, the payment order is pushed to each user terminal corresponding to the user identifiers included in the order identifier code of the order data record for the user terminal to make payment.

In some examples, the payment process is achieved by at least one of the following two modes.

In a first payment mode, one of multiple users completes order payment independently. Specifically, according to a number of user identifiers included in the order identifier code of the order data record, the payment order is made in multiple copies, and each copy of the payment order is pushed to each user terminal corresponding to the user identifiers included in the order identifier code of the order data record respectively; according to a received payment request triggered for the payment order, payment is made for the payment order. Specifically, in order to help achieve the effect of multiple-user payment, in response to that a payment order corresponding to the order data record is generated, each user identifier included in the order identifier code of the order data record is queried for. According to a query result, the payment order is pushed to the user terminal corresponding to each user identifier included in the order identifier code of the order data record respectively. The payment order is used to achieve the function of order payment and includes information such as details of service items to be paid, a payment amount and a payment portal element. In this payment mode, each user participating in ordering can receive a corresponding payment order. Each ordering user receiving the payment order can trigger a payment request for the received payment order. For example, the payment request can be triggered through the payment portal element included in the payment order. Correspondingly, a backstage server makes payment for the payment order according to the received payment request triggered for the payment order. Specifically, in order to prevent an ordering user from paying an order of an adjacent table mistakenly, it is required to check whether a payment user matches an order to be paid in this step: it is determined whether a user identifier included in a received payment request for the payment order matches the order identifier code of the order data record corresponding to the payment order; if yes, payment is made for the payment order according to the payment request. For example, when the user identifier included in the received payment request for the payment order matches one of a plurality of user identifiers stored in the order identifier code of the order data record corresponding to the payment order, it indicates that the payment user matches the payment order and thus payment can be made; conversely, it indicates that the payment user does not match the payment order, the user will be prompted to check the payment order. Additionally, since any one of the plurality of ordering users can make order payment, conflict detection is needed so as to prevent repeated payment. Correspondingly, the payment order may be paid specifically in the following manner according to the received payment request triggered for the payment order: when the payment request triggered for the payment order is received, whether the payment order corresponding to the order data record is already paid is determined according to a service state field included in the order data record corresponding to the payment order; if not, payment is made for the payment order according to the received payment request triggered for the payment order, and the service state field included in the order data record corresponding to the payment order is updated according to a payment result; if yes, the payment request is rejected and a notification indicating that payment is already made is pushed to a user terminal corresponding to the payment request. The order data record further includes a service state field indicating whether a service resource corresponding to the order is paid, and correspondingly, repeated payment can be prevented by querying for a value of the service state field, so as to ensure only one of the plurality of users can successfully make payment. In the above manner, an order payment process can be completed by any one of a plurality of ordering users. Furthermore, considering that the plurality of ordering users may need to share the service resource corresponding to the order, in order to help share the service resource among the plurality of ordering users, when payment is made for the payment order according to the received payment request triggered for the payment order, a having-paid user (a user who has made payment) corresponding to the payment order is determined according to a user identifier included in the payment request; according to the order identifier code of the order data record corresponding to the payment request, at least one having-not-paid user (a user who has not made payment) corresponding to the payment order is determined; according to order amount data of the payment order and a number of the having-not-paid users, a to-be-paid amount corresponding to each having-not-paid user is determined; a payment notification message including the to-be-paid amount is sent to each having-not-paid user, and when a payment request triggered for the payment notification message by each having-not-paid user is received, account data corresponding to a user account of the having-paid user is updated based on the payment request. Therefore, in the above manner, a notification message including a to-be-paid amount is sent to the remaining users who has not made payment automatically to direct the remaining users who has not made payment to complete payment, and further transfer a payment amount of each having-not-paid user to a user account of the having-paid user, thereby achieving the purpose of sharing the service resource among a plurality of ordering users. This manner is particularly applicable to a service scenario of multi-person ordering.

In a second payment mode, a plurality of users cooperatively complete order payment. Specifically, according to a number of user identifiers included in the order identifier code of the order data record, the payment order is split into a plurality of payment sub-orders, where a total of order mounts of the payment sub-orders is matched with the order amount of the payment order; each payment sub-order is pushed to a user terminal corresponding to each user identifier included in the order identifier code of the order data record respectively; according to a received payment request triggered for the payment order, payment is made for the payment order. In this manner, the payment order can be split into a plurality of payment sub-orders such that a plurality of ordering users can make payment respectively, thus helping to share the service resource cost among the plurality of ordering users. The specific splitting operation for the payment order can be achieved in a plurality of manners, which will not be limited herein. In a first splitting manner, when the number of the user identifiers included in the order identifier code of the order data record is N, the payment order is split into N payment sub-orders with order amounts being equal, where N is a natural number. For example, if a total amount of the payment order is 100 and N is 4, the amount of each split payment sub-order is 25. In a second splitting manner, when the number of the user identifiers included in the order identifier code of the order data record is N, for each user identifier included in the order identifier code of the order data record, user attribute information corresponding to the user identifier is obtained, and M user identifiers are selected from the N user identifiers as user identifiers of target payment users according to the user attribute information corresponding to each user identifier; the payment order is split into M payment sub-orders respectively corresponding to different target payment users, an order amount of the payment sub-order corresponding to a respective target payment user is determined according to the user attribute information of the respective target payment user, and a correspondence of a respective target payment user, a sub-order identifier and an order amount of the payment sub-order corresponding to the respective target payment user is recorded in the order data record, where N and M are natural numbers and M is smaller than or equal to N. The user attribute information includes ordering record information, historical payment information, and user level information and the like. Correspondingly, when target payment users are screened according to the user attribute information, users with the number of times of ordering greater than a preset ordering threshold, a historical payment amount greater than a preset payment amount, and/or a user level higher than a preset level are selected as target payment users. Furthermore, the order amount of the payment sub-order corresponding to the respective target payment user may also be determined based on the user attribute information. For example, the order amount of the payment sub-order corresponding to a user with a higher historical payment amount is enabled to be higher than the order amount of the payment sub-order corresponding to a user with a lower historical payment amount. Because the payment order is split into a plurality of payment sub-orders, the payment order can be in a paid state only when payment for each payment sub-order is completed. Correspondingly, after each sub-order is paid according to a received sub-order payment request triggered for each payment sub-order, the following is further included: payment states of the respective payment sub-orders corresponding to the payment order are obtained; whether there is a payment sub-order in an unpaid state is determined; if not, the payment order is determined as in a paid state, and the service state field included in the order data record corresponding to the payment order is updated. The order data record further includes the service state field indicating whether a service resource corresponding to the order is paid, and correspondingly, by querying for a value of the service state field, repeated order payment can be prevented and whether the order has been paid can be determined quickly. Specifically, the service state field of the order data record may further include a plurality of sub-fields corresponding to different payment sub-orders respectively to record whether the corresponding payment sub-orders have been paid.

At step S240, when a payment request triggered for the payment order is received, order payment data corresponding to the order data record is generated according to a user identifier included in the payment request.

Specifically, when a payment request triggered for the payment order is received, a payment process is completed based on the payment request and order payment data corresponding to order data record is generated based on a user identifier included in the payment request.

In the above first payment mode, order payment is completed by one user independently. Therefore, the payment request is a request corresponding to the entire payment order, and correspondingly, the order payment data may record a user identifier of an order paying user, a total amount of the payment order and payment time etc.

In the above second payment mode, order payment is completed by a plurality of users collaboratively. Therefore, a payment request triggered for the payment order includes a plurality of sub-order payment requests corresponding to different payment sub-orders respectively. Correspondingly, each time one sub-order payment request is received, sub-order payment data corresponding to the payment sub-order is recorded based on completion of a payment sub-order. Correspondingly, the order payment data corresponding to the order data record includes sub-order payment data corresponding to each payment sub-order respectively.

At step S250, the order payment data corresponding to the order data record is obtained, and the order payment data is added to the user historical payment record corresponding to the respective user identifier according to the respective user identifier included in the order identifier code of the order data record.

In some examples, N user identifiers included in the order identifier code of the order data record are obtained, and the order payment data is made in N copies; and a respective copy of the order payment data is added to the user historical payment record corresponding to the respective user identifier, where N is a natural number.

In the above first payment mode, the order payment data is directly made in a plurality of copies and the plurality of copies are then added to the user historical payment records corresponding to each user identifier respectively. In the above second payment mode, the order payment data including each piece of sub-order payment data is made in a plurality of copies and the plurality of copies are then added to the user historical payment records corresponding to each user identifier respectively, such that a respective ordering user can view the payment amounts of each ordering user. In another example, each piece of sub-order payment data is added to the user historical payment record of the ordering user corresponding to the sub-order payment data respectively. The specific implementation is not limited in the present disclosure.

At step S260, the user historical payment record corresponding to the respective user identifier is sent to a user terminal corresponding to the respective user identifier such that a corresponding user terminal manages the order data record through an order management portal associated with the order payment data and included in the user historical payment record.

Where each user corresponds to one user historical payment record which records historical payments of the user, and correspondingly, each user can determine each piece of order payment data within a preset historical period by querying its own user historical payment record, each piece of order payment data corresponds to one order, and has an associated order management portal for the user to manage the order.

The type and the number of the order management portal associated with the order payment data may be multiple. For example, the order management portal may include at least one of a service item query portal, a service resource management portal, a service state query portal, or a service evaluation portal. Correspondingly, the order data record further includes: a service item field for storing each service item included in the order data record, a service resource field for storing service resource information of the order data record and a service state field for storing service state information of the order data record; the service item query portal is used to query based on the service item field included in the order data record, the service resource management portal is used to perform management based on the service resource field included in the order data record, and the service state query portal is used to query based on the service state field included in the order data record. Specifically, the service item query portal is used to query for service items included in the order data record. For example, for a meal ordering service, the service items included in the order data record are different meal items selected by a user during ordering. The service resource portal is used to query for and manage a service resource corresponding to the order data record, for example, for a meal ordering service, the service resource mainly refers to an order payment amount. Correspondingly, the service resource management portal can be used not only to query for the payment amount of this order but also initiate a refund operation and the like for this order. The service state query portal may be used to query for an item logistic state and a delivery state etc. corresponding to an order.

Furthermore, the manner of the present disclosure may be applied to different service scenarios of ordering prepayment and ordering post-payment. The ordering post-payment refers to: after an order submission request is received, generating a corresponding service order based on the order submission request and pushing the service order to a service provider so that the service provider can provide services based on the service order. The ordering prepayment refers to: after an order submission request is received, generating a payment order corresponding to the order data record, and generating a corresponding service order only when the state of the payment order is updated as paid, and then pushing the service order to the service provider, such that the service provider provides services based on the service order.

As can be seen, in the above manner of the present disclosure, an order can be identified through a service device identifier, such that a plurality of ordering users corresponding to a same service device identifier can be associated. The order identifier code of this embodiment at least includes: a service device identifier and user identifiers of a plurality of ordering users associated based on the service device identifier, and correspondingly, the payment order generated based on the order data record also includes the order identifier code, and the payment request triggered for the payment order also includes the order identifier code of the order data record corresponding to the payment order to be paid. Therefore, the order identifier code of the embodiment is used through various service stages of this order. Thus, by use of the service device identifier and the user identifiers recorded in the order identifier code, it can be guaranteed that a plurality of users can make payment for this order. In addition, in the present disclosure, the payment order can be pushed to each ordering user respectively such that each ordering user has authority to make payment. Based on this, in the present disclosure, the payment order can be made in a plurality of copies which are provided to each ordering user respectively, such that the corresponding ordering user can manage the order data record through an order management portal associated with the order payment data and included in the user historical payment record, and the order management portal further includes an evaluation portal, a consumption record query portal and the like.

Moreover, another embodiment of the present disclosure further provides an order management method based on multi-person ordering, which is applied to a user terminal side. The order management method includes the following steps.

At step 1, an order querying request including a user identifier is sent to a server.

At step 2, a user historical payment record generated by the server based on an order data record of which an order identifier code includes the user identifier is received.

At step 3, the user historical payment record is displayed such that order management is performed based on the user historical payment record.

In some examples, the user historical payment record includes order payment data corresponding to the order data record of which the order identifier code includes the user identifier; displaying the user historical payment record includes:

displaying the order payment data included in the user historical payment record and an order management portal for managing the order payment data on a payment record query page.

In some examples, after displaying the order payment data included in the user historical payment record and the order management portal for managing the order payment data on the payment record query page, the method further includes:

receiving an order management request triggered through the order management portal, and performing order management based on the received order management request;

where the order management portal for managing the order payment data includes at least one of a service item query portal, a service resource management portal, a service state query portal, or a service valuation portal.

In some examples, the order data record further includes: a service item field for storing each service item included in the order data record, a service resource field for storing service resource information of the order data record, and a service state field for storing service state information of the order data record; the service item query portal is used for querying based on the service item field included in the order data record, the service resource management portal is used for performing management based on the service resource field included in the order data record, and the service state query portal is used for querying based on the service state field included in the order data record.

In some examples, before the method is performed, the method further includes:

sending an ordering service request including a service device identifier and a user identifier, such that the server creates an order data record corresponding to the service device identifier according to the service device identifier and the user identifier included in the ordering service request received each time; where an order identifier code of the order data record includes the service device identifier and a plurality of user identifiers associated with the service device identifier.

In some examples, before sending the order querying request including the user identifier to the server, the method further includes:

receiving a payment order corresponding to a pre-created order data record from a cloud server, where the payment order includes a payment portal for each user receiving the payment order to make payment; where order payment data of the user historical payment record further includes a payment user identifier. Therefore, in this embodiment, a user terminal corresponding to each user identifier included in the order identifier code may receive the payment order and has authority to make payment. After one or more users complete payment, the server may record the payment user identifier and further include the payment user identifier in the order payment data. Correspondingly, the user corresponding to each user identifier included in the order identifier code can query this order from his historical payment record and view the payment user of this order.

Third Embodiment

FIG. 3 is a structural schematic diagram illustrating an order management system based on multi-person ordering according to a third embodiment of the present disclosure. The system includes the following modules.

an obtaining module 31, configured to obtain order payment data corresponding to a pre-created order data record, where the order data record is created according to a service device identifier and a user identifier included in an ordering service request received each time;

a payment record adding module 32, configured to, according to a respective user identifier included in an order identifier code of the order data record, add the order payment data to a user historical payment record corresponding to the respective user identifier; where the order identifier code of the order data record includes the service device identifier and a plurality of user identifiers associated with the service device identifier;

a sending module 33, configured to send the user historical payment record corresponding to the respective user identifier to a user terminal corresponding to the respective user identifier such that a corresponding user terminal manages the order data record through an order management portal which is associated with the order payment data and included in the user historical payment record.

In some examples, the payment record adding module is specifically configured to:

obtain N user identifiers included in the order identifier code of the order data record and make N copies of the order payment data;

add a respective copy of the order payment data to the user historical payment record corresponding to the respective user identifier, where N is a natural number.

In some examples, the order management portal associated with the order payment data includes at least one of:

a service item query portal, a service resource management portal, a service state query portal, or a service valuation portal.

In some examples, the order data record further includes:

a service item field for storing each service item included in the order data record, a service resource field for storing service resource information of the order data record, and a service state field for storing service state information of the order data record;

where the service item query portal is used for querying based on the service item field included in the order data record, the service resource management portal is used for performing management based on the service resource field included in the order data record, and the service state query portal is used for querying based on the service state field included in the order data record.

In some examples, the system further includes:

an order generating module, configured to: each time an ordering service request is received, obtain a service device identifier and a user identifier included in the ordering service request received this time and determine whether an effective billing identifier associated with the service device identifier is present in a preset billing data table.

If the effective billing identifier is present, an already-created order data record corresponding to the service device identifier and the effective billing identifier is obtained and the user identifier included in the ordering service request received this time is added to an order identifier code of the order data record.

If there is no effective billing identifier associated with the service device identifier in the billing data table, an effective billing identifier associated with the service device identifier is generated, the service device identifier and the generated effective billing identifier are stored in the billing data table in an associated manner, and an order data record corresponding to the service device identifier and the effective billing identifier is created, where an order identifier code of the created order data record includes the service device identifier, the effective billing identifier and the user identifier included in the ordering service request received this time.

In some examples, the order generating module is further configured to:

according to a received service item addition request triggered for the order data record, add a service item corresponding to the service item addition request to a service item field included in the order data record;

when receiving an order submission request triggered for the order data record, generate a payment order corresponding to the order data record according to each service item added to the service item field included in the order data record.

In some examples, the service item addition request triggered for the order data record includes: a plurality of service item addition requests sent respectively by user terminals corresponding to each user identifier included in the order identifier code of the order data record.

In some examples, the obtaining module is specifically configured to:

when receiving a payment request triggered for the payment order, generate the order payment data corresponding to the order data record according to the user identifier included in the payment request.

In some examples, the ordering service request includes: a code scanning ordering request based on a two-dimensional code, where the two-dimensional code includes a service device identifier.

The specific structures and working principles of different modules as described above may be referred to the descriptions of the corresponding part of the method embodiments and will not be repeated herein.

In addition, another embodiment of the present disclosure further provides an order management terminal based on multi-person ordering. The terminal may be various electronic devices such as smart phone. The order management terminal includes the following modules.

a querying module, configured to send an order querying request including a user identifier to a server;

a receiving module, configured to receive a user historical payment record generated by the server based on an order data record of which the order identifier code comprises the user identifier;

a displaying module, configured to display the user historical payment record such that order management is performed based on the user historical payment record.

In some examples, the user historical payment record includes order payment data corresponding to the order data record of which the order identifier code comprises the user identifier and the displaying module is specifically configured to:

display the order payment data included in the user historical payment record and an order management portal for managing the order payment data on a payment record query page.

In some examples, the displaying module is further configured to:

receive an order management request triggered through the order management portal, and perform order management based on the received order management request;

where the order management portal for managing the order payment data includes at least one of a service item query portal, a service resource management portal, a service state query portal, or a service valuation portal.

In some examples, the order data record further includes: a service item field for storing each service item included in the order data record, a service resource field for storing service resource information of the order data record, and a service state field for storing service state information of the order data record;

where the service item query portal is used for querying based on the service item field included in the order data record, the service resource management portal is used for performing management based on the service resource field included in the order data record, and the service state query portal is used for querying based on the service state field included in the order data record.

In some examples, the terminal further includes:

an ordering module, configured to: send an ordering service request including a service device identifier and a user identifier, such that the server creates an order data record corresponding to the service device identifier according to the service device identifier and the user identifier included in the ordering service request received each time; where an order identifier code of the order data record includes the service device identifier and a plurality of user identifiers associated with the service device identifier.

In some examples, the ordering module is further configured to:

receive a payment order corresponding to a pre-created order data record from a cloud server, where the payment order includes a payment portal for each user receiving the payment order to make payment;

where order payment data of the user historical payment record further includes a payment user identifier.

Fourth Embodiment

The fourth embodiment of the present disclosure provides a non-transitory computer readable storage medium storing at least one executable instruction, where the computer executable instruction can perform the order management method based on multi-person ordering in any one of the above method embodiments. The executable instruction may be specifically used to cause a processor to perform the corresponding operations in the above method embodiments.

Fifth Embodiment

Figure 4:
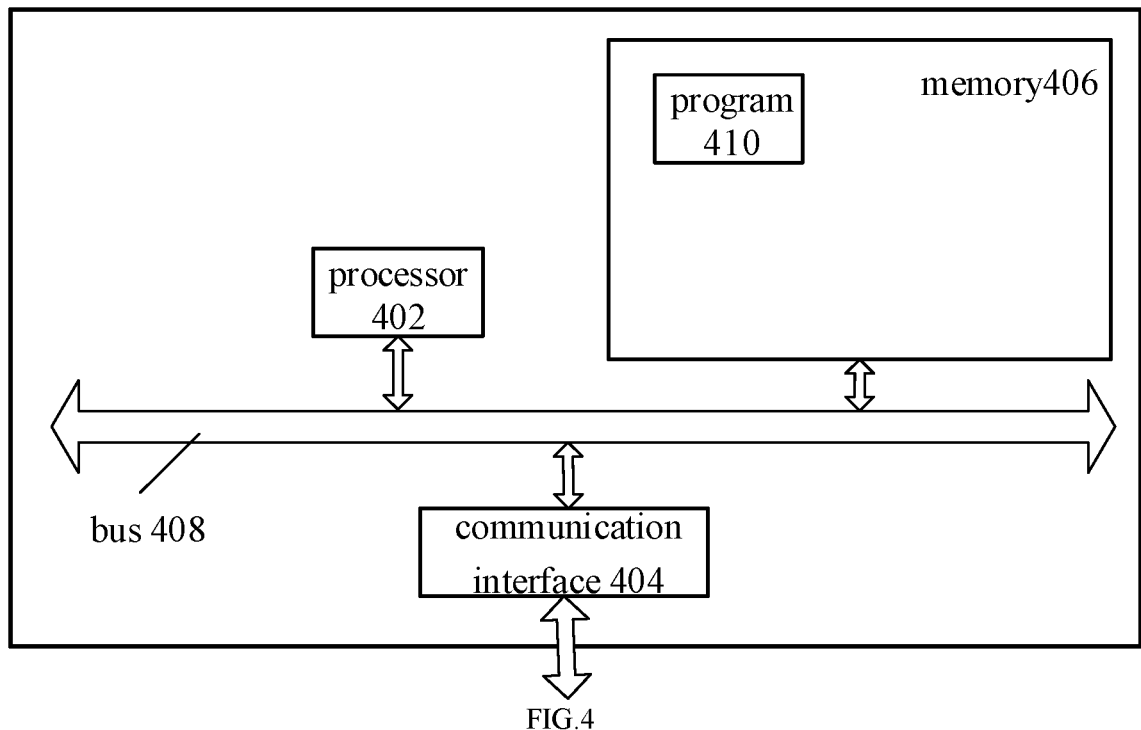
FIG. 4 is a schematic structural diagram illustrating an electronic device according to a fifth embodiment of the present disclosure.

FIG. 4 is a structural schematic diagram illustrating an electronic device according to a fifth embodiment of the present disclosure. In this embodiment, no limitation is made to the specific implementation of the electronic device.

As shown in FIG. 4, the electronic device may include a processor 402, a communication interface 406, a memory 404 and a communication bus 408.

Where
the processor 402, the memory 404 and the communication interface 406 communicate with each other via the communication bus 408.

The communication interface 406 is used for network element communication with other devices such as a client or other servers or the like.

The processor 402 is configured to execute a program 410 so as to perform relevant steps in the embodiments of the above order management method based on multi-person ordering.

Specifically, the program 410 may include a program code including a computer operation instruction.

The processor 402 may be a Central Processing Unit (CPU) or an Application Specific Integrated Circuit (ASIC), or configured to be one or more integrated circuits for implementing the embodiments of the present disclosure. One or more processors included in the electronic device may be processors of same type, for example, one or more CPUs, or processors of different types, for example, one or more CPUs and one or more ASICs.

The memory 404 is configured to store the program 410. The memory 404 may include a high speed Random Access Memory (RAM), or a non-transitory memory, for example, at least one magnetic disk memory.

The program 410 may be specifically configured to cause the processor 402 to perform the corresponding operations in the above method embodiments.

Those algorithms and display mentioned herein are not inherently related to any specific computer, virtual system or another device. Various general systems may also be used together with teachings described herein. According to the above descriptions, the structure required to construct such systems is apparent. Furthermore, the present disclosure is not for any specific programming language. It should be understood that the contents of the present disclosure described herein can be implemented using various programming languages and the above descriptions of the specific language are used only for disclosing the preferred embodiments of the present disclosure.

In the specification provided herein, a large number of specific details are described. However, it can be understood that the embodiments of the present disclosure can be practiced without these specific details. In some instances, those well-known methods, structures and technologies are not shown in details so as not to obscure the understanding of the specification.

Similarly, it should be understood that, in order to simplify the present disclosure and help understand one or more aspects of the present disclosure, various features of the present disclosure may sometimes be grouped into a single embodiment, diagram or descriptions thereof in the above descriptions of the exemplary embodiments of the present disclosure. However, the method of the present disclosure shall not be interpreted to reflect the following intentions: the claims of the present disclosure to be protected have more features than recorded clearly in each claim. More specifically, as reflected in the following claims, the disclosed aspects are fewer than all features of a single embodiment disclosed above. Therefore, the claims following the specific implementations will be clearly incorporated into the specific embodiments where each claim itself serves as a separate embodiment of the present disclosure.

Those skilled in the art shall understand that modules in a device of an embodiment of the present disclosure may be adaptively changed and disposed in one or more devices different from this embodiment. Modules, or units, or components in the embodiments may be combined into one module, or unit or component, and may also be separated into several sub-modules, or sub-units, or sub-components. Except that at least some of such features, and/or processes or units are exclusive to each other, all features disclosed in the specification (including accompanying claims, abstract and drawings) and all processes or units of any method or device disclosed this way may be combined in any combination. Unless otherwise clearly stated, each feature disclosed in the specification (including accompanying claims, abstract and drawings) may be replaced with a replacement feature capable of providing same, equivalent or similar purpose.

Furthermore, those skilled in the art can understand that, although some embodiments herein may include some features included in other embodiments rather than other features, combinations of features of different embodiments means falling within the scope of the present disclosure and form a different embodiment. For example, in the following claims, any one of the claimed embodiments may be used in any combination.

Each component embodiment of the present disclosure may be implemented by hardwares or by software modules running on one or more processors, or by their combinations. Those skilled in the art should understand that microprocessors or digital signal processors (DSP) may be used in practice to implement some or all functions of some or all components in an order management system based on multi-person ordering in the embodiments of the present disclosure. The present disclosure may further be implemented as part or all of device or apparatus programs (e.g. computer program or computer program product) for executing the method described herein. Such programs for implementing the present disclosure may be stored in a computer readable medium, or take the form of one or more signals. Such signals may be downloaded from an internet website, or provided on carrier signals, or provided in any form.

It should be understood that the above embodiments are used to describe the present disclosure rather than limit the present disclosure and those skilled in the art may devise alternative embodiments without departing from the scope of the appended claims. In the claims, any reference symbols in parentheses shall not be interpreted to limit the claims. The word "include" does not preclude presence of an element or component not listed in the claims. The words "one" and "a" appearing before a component do not preclude presence of a plurality of such elements. The present disclosure may be implemented by use of hardware including several different elements or by an appropriately programmed computer. In the unit claims listing several apparatuses, several of these apparatuses may be specifically embodied by a same hardware item. The use of the words "first", "second" and "third" and the like does not mean any sequence and may be interpreted as names.

What is claimed is:

1. An order management method based on multi-person ordering, comprising:

obtaining order payment data corresponding to a pre-created order data record, wherein the order data record is created according to a service device identifier and a user identifier comprised in an ordering service request received each time, and the ordering service request comprises a code scanning ordering request based on a two-dimensional code on a service device scanned by a user terminal, wherein the two-dimensional code comprises the service device identifier of the service device;

according to a respective user identifier comprised in an order identifier code of the order data record, adding the order payment data to a user historical payment record corresponding to the respective user identifier, wherein the order identifier code of the order data record comprises a first field for storing the service device identifier and a third field for storing a plurality of user identifiers associated with the service device identifier, with the third field further comprising a plurality of sub-fields corresponding to the plurality of user identifiers, respectively, and wherein according to the respective user identifier comprised in the order identifier code of the order data record, adding the order payment data to the user historical payment record corresponding to the respective user identifier comprises: obtaining N user identifiers comprised in the order identifier code of the order data record and making N copies of the order payment data; and adding a respective copy of the order payment data to the user historical payment record corresponding to the respective user identifier, wherein N is a natural number; and sending the user historical payment record corresponding to the respective user identifier to a user terminal corresponding to the respective user identifier such that a corresponding user terminal manages the order data record through an order management portal which is associated with the order payment data and comprised in the user historical payment record.

2. The method of claim 1, wherein the order management portal associated with the order payment data comprises at least one of:

a service item query portal, a service resource management portal, a service state query portal, or a service valuation portal.

3. The method of claim 2, wherein the order data record further comprises:

a service item field for storing each service item comprised in the order data record, a service resource field for storing service resource information of the order data record, and a service state field for storing service state information of the order data record;

wherein the service item query portal is used for querying based on the service item field comprised in the order data record, the service resource management portal is used for performing management based on the service resource field comprised in the order data record, and the service state query portal is used for querying based on the service state field comprised in the order data record.

4. The method of claim 1, wherein before obtaining the order payment data corresponding to the pre-created order data record, the method further comprises:

each time an ordering service request is received, obtaining a service device identifier and a user identifier comprised in the ordering service request received this time and determining whether an effective billing identifier associated with the service device identifier is present in a preset billing data table;

if yes, obtaining an already-created order data record corresponding to the service device identifier and the effective billing identifier and adding the user identifier comprised in the ordering service request received this time to an order identifier code of the order data record;

if not, generating an effective billing identifier associated with the service device identifier and storing the service device identifier and the effective billing identifier in the billing data table in an associated manner, creating an order data record corresponding to the service device identifier and the effective billing identifier, wherein an order identifier code of the order data record comprises the service device identifier, the effective billing identifier and the user identifier comprised in the ordering service request received this time.

5. The method of claim 1, wherein before obtaining the order payment data corresponding to the pre-created order data record, the method further comprises:

according to a received service item addition request triggered for the order data record, adding a service item corresponding to the service item addition request to a service item field comprised in the order data record;

when receiving an order submission request triggered for the order data record, generating a payment order corresponding to the order data record according to each service item added to the service item field comprised in the order data record.

6. The method of claim 5, wherein the service item addition request triggered for the order data record comprises: a plurality of service item addition requests sent respectively by user terminals corresponding to each user identifier comprised in the order identifier code of the order data record.

7. The method of claim 5, wherein obtaining the order payment data corresponding to the pre-created order data record comprises:

when receiving a payment request triggered for the payment order, generating the order payment data corresponding to the order data record according to the user identifier comprised in the payment request.

8. An electronic device, comprising a processor, a memory, a communication interface and a communication bus, wherein the processor, the memory and the communication interface communicate with each other via the communication bus;

the memory is configured to store at least one executable instruction, and the executable instruction causes the processor to perform the following operations:

obtaining order payment data corresponding to a pre-created order data record, wherein the order data record is created according to a service device identifier and a user identifier comprised in an ordering service request received each time, and the ordering service request comprises a code scanning ordering request based on a two-dimensional code on a service device scanned by a user terminal, wherein the two-dimensional code comprises the service device identifier of the service device;

according to a respective user identifier comprised in an order identifier code of the order data record, adding the order payment data to a user historical payment record corresponding to the respective user identifier, wherein the order identifier code of the order data record comprises a first field for storing the service device identifier and a third field for storing a plurality of user identifiers associated with the service device identifier, with the third field further comprising a plurality of sub-fields corresponding to the plurality of user identifiers, respectively, and wherein according to the respective user identifier comprised in the order identifier code of the order data record, adding the order payment data to the user historical payment record corresponding to the respective user identifier comprises: obtaining N user identifiers comprised in the order identifier code of the order data record and making N copies of the order payment data; and adding a respective copy of the order payment data to the user historical payment record corresponding to the respective user identifier, wherein N is a natural number; and sending the user historical payment record corresponding to the respective user identifier to a user terminal corresponding to the respective user identifier such that a corresponding user terminal manages the order data record through an order management portal which is associated with the order payment data and comprised in the user historical payment record.

9. A non-transitory computer readable storage medium storing at least one executable instruction, wherein the executable instruction causes a processor to perform operations corresponding to the order management method based on multi-person ordering according to claim 1.

* * * * *